G. L. MORRIS.
SCREW.
No. 59,923. Patented Nov. 20, 1866.
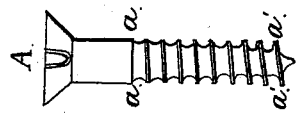
Witnesses
Henry C. Houston
Wm. P. Preble
Inventor:
Geo. L. Morris
by his attorney
William H. Clifford

United States Patent Office.

IMPROVEMENT IN SCREWS.

GEORGE L. MORRIS, OF TAUNTON, MASSACHUSETTS.

Letters Patent No. 59,923, dated November 20, 1866.

SPECIFICATION.

TO ALL WHOM IT MAY CONCERN:

Be it known that I, GEORGE L. MORRIS, of Taunton, in the Commonwealth of Massachusetts, have invented certain new and useful improvements in the manufacture of Screws; and I hereby declare the following to be a full, clear, and exact description thereof, which will enable others to make and use my invention, reference being made to the accompanying drawings, forming part of this specification, in which is shown a cast screw, which embodies my improvements.

I am aware that screws have heretofore been cast when forming a part of some other article of manufacture, which is also cast, and from which article they cannot be separated but by breaking the screw, generally rudely and imperfectly made. My invention embraces alone that class of screws known and distinguished from others by the term "wood screw." These have hitherto been made by cutting the thread upon the stem, after the stem has first been made. My improved screw is cast, all parts being made at the same time.

I will now proceed to give, in connection with the accompanying drawings, a more particular description of my invention. My improved screw embodies several features, as follows: 1. A conical stem under the thread; concave faces or sides of the thread; rounded channels between the threads; and a thread, the diameter of the circle described by which is the same throughout the length of the screw, except the final convolution of the thread; also a horizontal cutting edge for the point of the screw. A shows a cast screw, the stem of which, between the head and the commencement of the thread, is straight and of even size. From the commencement of the thread the stem tapers so that it is conical in shape towards the point. The thread describes circles, the diameter of which are equal, or, in other words, a line drawn from $a$ to $a'$ vertically will touch all the threads equally. Between the convolutions of the thread are rounded channels; these allow the thread to be sufficiently thin at its edge, and thick enough at its junction with the screw, for strength. The sides of the thread are concave, so formed by the rounded spaces between the convolutions of the thread. This shape to the sides of the screw thread enables the manufacturer to combine in the most feasible manner strength, a deep thread, and consequent increased holding-power of the screw. The final convolution of the thread of the screw runs off somewhat rapidly to the point, which has a horizontal cutting edge, which experience proves to be both the best to receive a quick and secure insertion, and for the purpose of making the screw self-inserting. My improved screw can be inserted into all ordinary lumber without first making a hole; this is in consequence of the conical stem under the thread, the thin edges of the thread, and the horizontal cutting edge of the point. I am aware that screws have been made with all the convolutions of the thread on the point, except the terminal convolution, of equal diameter, so as to secure a firm holding of the screw, particularly at the first insertion, but this is not the subject of my invention, and the screw above referred to was made in the ordinary manner and not cast. I am also aware that screws have been made having a single one of some other of the different features of my improved screw, but these will be found to be screws made in the common manner and not cast, and I do not claim any of these several features by itself, but all in combination with a cast screw. The roughness of the surface of the cast screw gives it additional tenacity and firmness. The conical form of the stem and the form of the thread render it less liable to break by twisting off the stem when being inserted into close and solid wood. My improved screw may be made either with a single slot in the head thereof, or with two nicks, divided by a small partition; but these are not the subject of my claim. I cast my screw in the ordinary manner, by having moulds of the proper shape and construction for the purpose.

What I claim as my invention, and desire to secure by Letters Patent, is—

As a new article of manufacture, a cast wood screw, combining the conical stem under the thread; thread whose convolutions are all of the same diameter except the last; concave faces to the thread; rounded spaces between the convolutions of the thread, and the horizontal cutting edge for the point.

GEO. L. MORRIS.

Witnesses:
SILAS Q. MORRIS,
M. E. PUTNEY.